Patented Nov. 16, 1926.

1,607,365

UNITED STATES PATENT OFFICE.

JOSEPH L. RAFFETTO, OF NEW YORK, N. Y., ASSIGNOR TO G. B. RAFFETTO, INC., OF NEW YORK, N. Y., A CORPORATION OF NEW YORK.

PRESERVED AND JELLIED FRUIT.

No Drawing. Application filed September 23, 1925. Serial No. 58,016.

This invention embodies substantially solid jellied fruits preserved with brandy and has for its object several important advantages among which may be mentioned the following: First, the product, in pronounced contradistinction from prior so-called "brandy preserves", is entirely free from liquidity; that is to say, it is substantially solid, and, when withdrawn from its container, substantially retains its form or shape as a unitary mass; second, the jellied fruit need not be heated, to effect sterilization, to any such extent as has heretofore been the practice for the reason that the brandy and gelatine employed exert a joint preservative effect on the fruit, and moreover, the solidity of the product precludes undue exposure of the fruit to air; third, the fact that the fruit may be efficiently preserved with less heating, as described, results in a preserved fruit which is firmer, i. e., less disintegrated, than has been the case heretofore; fourth, the product, because of such lack of extended heating, retains its natural color, aroma and taste almost perfectly; fifth, the completed brandied and jellied product, due to a pronounced extent to the gelatine or pectin employed to effect solidity, is particularly nutritious and of high calorific value, and, sixth, the attractive eye appearance of the product imparts to it a pronounced and distinctive zest not inherent in the preserved fruits of the prior art.

Features and advantages of the new products, other than those adverted to, will be apparent to those skilled in the art, and, more particularly, from the following detailed description of the preferred method of producing the new jellied products.

In practically carrying out the process which results in the new products, I prefer to proceed in substantially the following way, using, substantially, the proportions of materials or ingredients specified, though it will be understood that slight modifications may be made, both as regards procedure and proportions of ingredients, without departing from the spirit or substance of the invention.

I take twelve (12) liquid ounces of a mixture consisting of syrup of a strength of approximately 32 degrees Baumé and about three (3) ounces of apple or fruit pectin; one and one-quarter (1¼) pints of the fruit to be jellied and a sufficient quantity of brandy of such proof as to give approximately, three (3) to four (4) ounces of alcohol by volume in a quart jar of the finished jellied product. Gelatine may, if desired, be used to replace the pectin in whole or in part.

The ingredients may be combined in various ways such as by adding the fruit to the syrup, heating to the desired extent to effect sterilization, whereupon the pectin or gelatine, or a mixture thereof is admixed with the hot syrup and fruit, and after the mass has become homogenous and uniformly mixed (and cooled, if deemed advisable), the brandy is added and properly incorporated with the other ingredients and the mixture thereupon bottled or canned as customarily. If preferred, the pectin or gelatine may be uniformly mixed with the syrup, prior to adding the fruit, or the pectin and gelatine, or mixture thereof, may be added to the syrup simultaneously with the fruit. It will be understood, also, that any mixture of fruits, two or more, may be used if desired.

Having thus fully described the invention, what I claim as new and desire to secure by Letters Patent is:

1. As a new article of manufacture sterilized non-disintegrated fruit encased in a jellifying and solidifying agent and containing brandy as a preserving agent.

2. As a new article of manufacture non-disintegrated fruit encased in a jellifying and solidifying agent containing pectin and sufficient alcohol agent to preserve the same.

3. As a new article of manufacture sterilized non-disintegrated fruit encased in a jellifying and solidifying agent containing pectin and gelatine and sufficient brandy to preserve the same.

In testimony whereof I have signed the foregoing specification.

JOSEPH L. RAFFETTO.